(12) United States Patent
Eppink

(10) Patent No.: US 11,980,169 B1
(45) Date of Patent: May 14, 2024

(54) ANIMAL FEEDING SYSTEM AND METHOD OF USE

(71) Applicant: Jay Milton Eppink, Spring, TX (US)

(72) Inventor: Jay Milton Eppink, Spring, TX (US)

(*) Notice: Subject to any disclaimer, the term of this patent is extended or adjusted under 35 U.S.C. 154(b) by 314 days.

(21) Appl. No.: 17/568,593

(22) Filed: Jan. 4, 2022

(51) Int. Cl.
*A01K 5/02* (2006.01)
(52) U.S. Cl.
CPC .................................. *A01K 5/0291* (2013.01)
(58) Field of Classification Search
CPC .............. A01M 31/008; A01M 31/002; A01M 31/006; A01M 31/004; A01K 5/00; A01K 5/0275; A01K 5/0291
See application file for complete search history.

(56) References Cited

U.S. PATENT DOCUMENTS

| | | | | |
|---|---|---|---|---|
| 2017/0079260 | A1* | 3/2017 | Hays | ........................ F41G 1/38 |
| 2018/0220641 | A1* | 8/2018 | Read | .................. A01M 31/002 |
| 2018/0300662 | A1* | 10/2018 | Lauve, IV | ......... G06Q 10/1097 |
| 2020/0253162 | A1* | 8/2020 | Vachula | ................ A01K 5/0291 |
| 2022/0327852 | A1* | 10/2022 | Monk | .................... G06V 20/52 |

* cited by examiner

*Primary Examiner* — Abby Y Lin
*Assistant Examiner* — Dylan M Katz
(74) *Attorney, Agent, or Firm* — Richard Eldredge; Leavitt Eldredge Law Firm

(57) ABSTRACT

An animal feeding system includes a feed storage container having an interior area for animal feed; an outlet attached to the feed storage container at a first end and extending to a second end to allow the animal feed to flow therethrough via gravity to the second end; an access device attached at the second end of the outlet; a motor in electrical communication with the access device to open and close the access device to provide and remove access to the animal feed; and a control system in electrical communication with the motor to send commands to the motor, the control system having a programmable chip; and a sensor suite, the sensor suite collecting information to provide to the programmable chip; the programmable chip operates a timer based on the information from the sensor suite to open and close the access device; a data log is created.

5 Claims, 19 Drawing Sheets

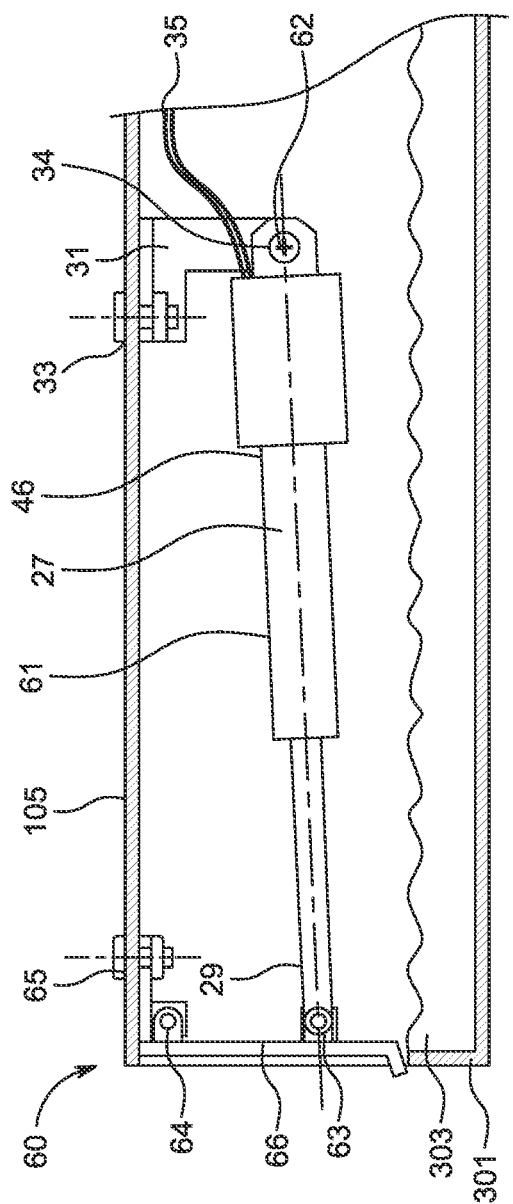
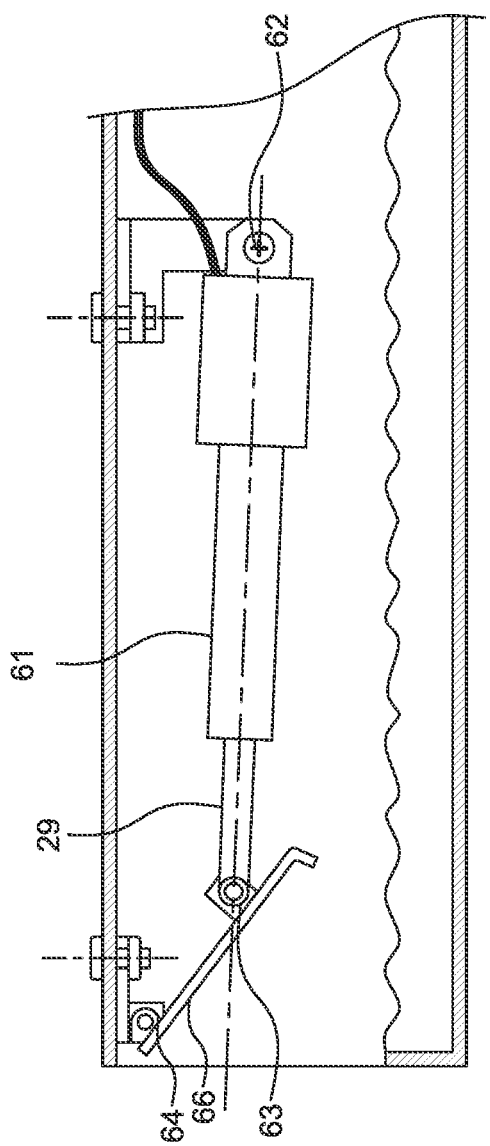
FIG. 11
FIG. 12

ANIMAL FEEDING SYSTEM AND METHOD OF USE

BACKGROUND

1. Field of the Invention

The present invention relates generally to animal feeding systems, and more specifically, to an animal feeding system and method that utilizes gravity flow as well as a programmable controller to provide for feeding at one or more predetermined times to correlate to hunting times.

2. Description of Related Art

Various types of animal feeders have been developed for unattended feeding of game animals in the wild. These feeders are utilized in remote areas so as to lure game animals to a particular location at most active feeding times for hunting purposes. One popular such type feeder with many and various designs uses gravity for flow of the feed for animals that allows continuous access to the feed. Other feeders periodically dispense a controlled amount of animal feed per day to provide access to feed only at specific times, however, animals may not always show up at the specified times, thereby wasting feed.

Accordingly, although great strides have been made in the area of animal feeder systems, many shortcomings remain.

The present invention provides for an animal feed system that utilizes gravity and an access device to provide access to the feed only at specific times, wherein those specific times are determined based on a correlation between optimal feed times and hunting times, as will be discussed herein. It will be appreciated, as discussed herein, that the present invention provides for other benefits over the current state of the art.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 11 is a detail side view of one embodiment of a linear actuator with a pivotally attached door hinged to the top of the outlet in the closed position in accordance with the present invention;

FIG. 12 is a detail side view of one embodiment of a linear actuator with a pivotally attached door hinged to the top of the outlet in the open position in accordance with the present invention;

Figure 1:
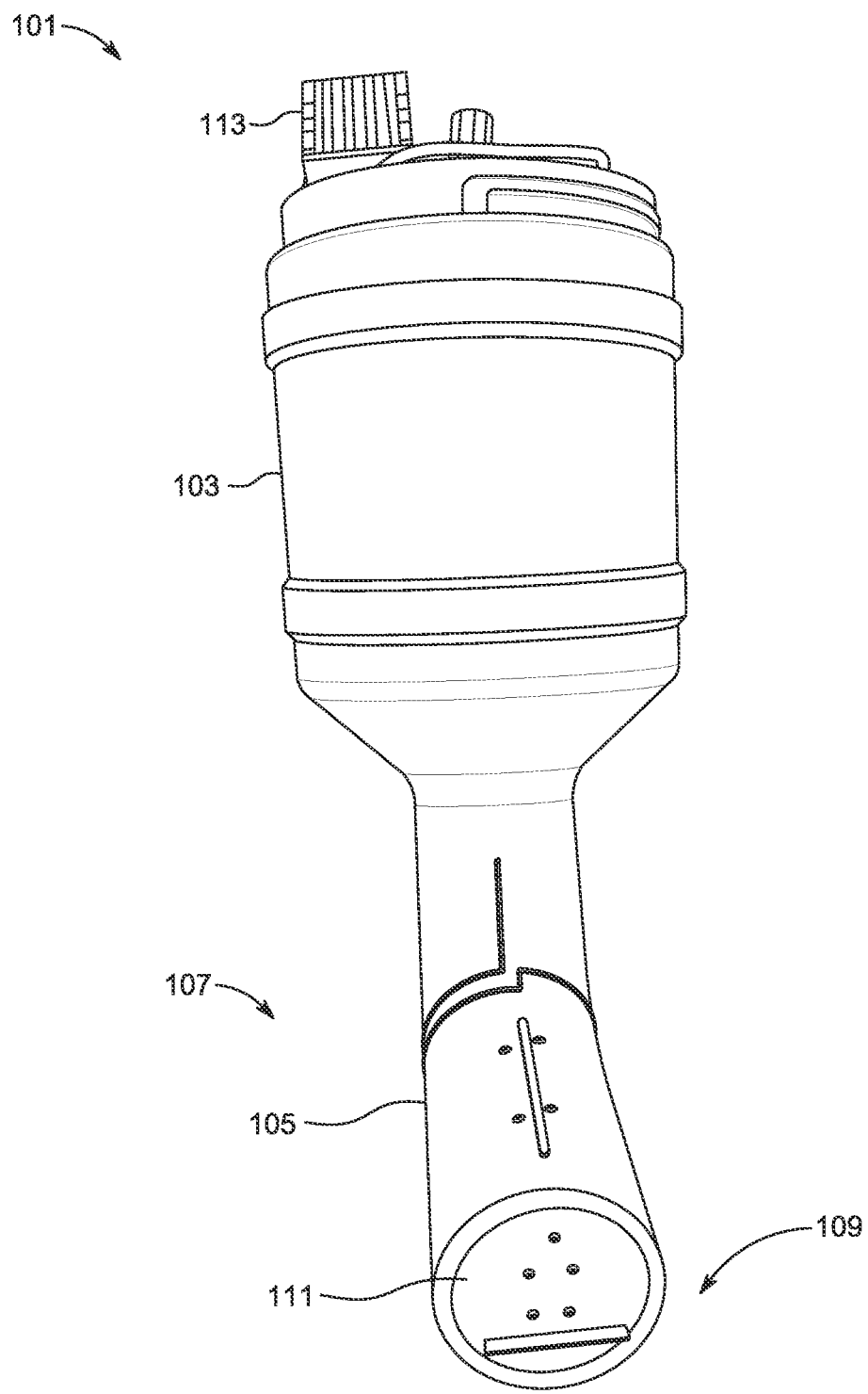
FIG. 1 is a front view of an animal feeder system in accordance with the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional animal feeding systems. Specifically, the present invention provides for a gravity feeding system that allows for feeding only at specific times. In addition, the present invention provides for a programmable chip that operates with a control system to establish optimal times of feeding based on when the feeding system is being utilized as well as through user input of optimal hunting times, thereby encouraging game to feed during optimal hunting times. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a front view of a animal feeder system 101 in accordance with a preferred embodiment of the present application. It will be appreciated that system 101 overcomes one or more of the above-listed problems commonly associated with conventional animal feeder systems.

In the contemplated embodiment, system 101 includes a feed storage container 103 having an interior area configured to receive and hold an animal feed. An outlet 105 is attached to the feed storage container at a first end 107 and extends to a second end 109, the outlet configured to allow the animal feed to flow therethrough via gravity to the second end. An access device 111 is attached at the second end of the outlet and provides for opening and closing of the outlet 105 as will be discussed herein.

As shown, at a top end of the feed storage container 103, there can be secured one or more solar panels 113 to provide power to the electrical components discussed herein.

In some embodiments, the outlet is tubular in nature and is configured to be positioned at an angle with respect to a ground surface while the feed storage container 103 extends upward, thereby allowing for gravity to direct the feed therein.

Figure 2:
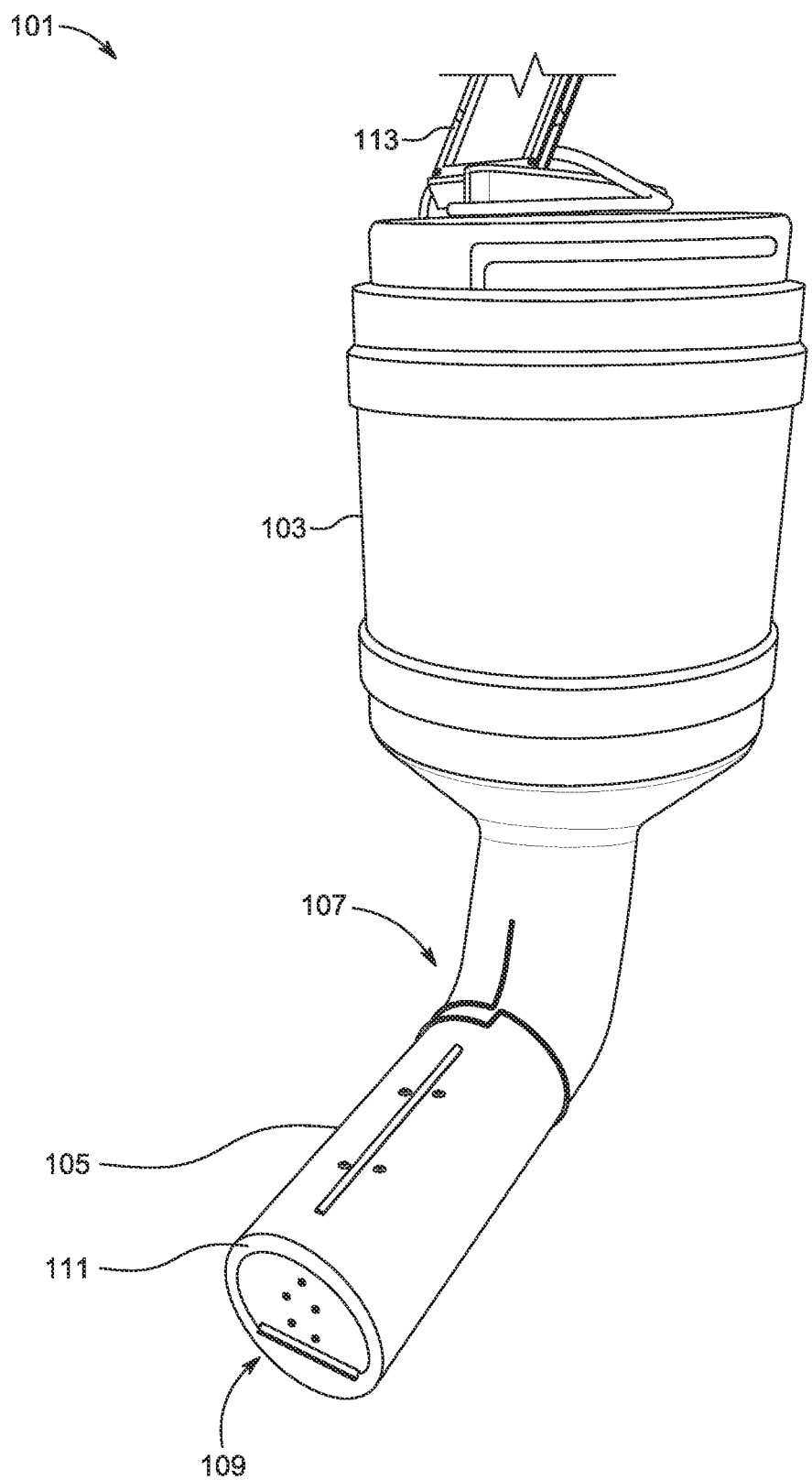
FIG. 2 is a side view of the animal feeder system of FIG. 1.

In FIG. 2, a side view depicts system 101 for clarity.

Figure 3:
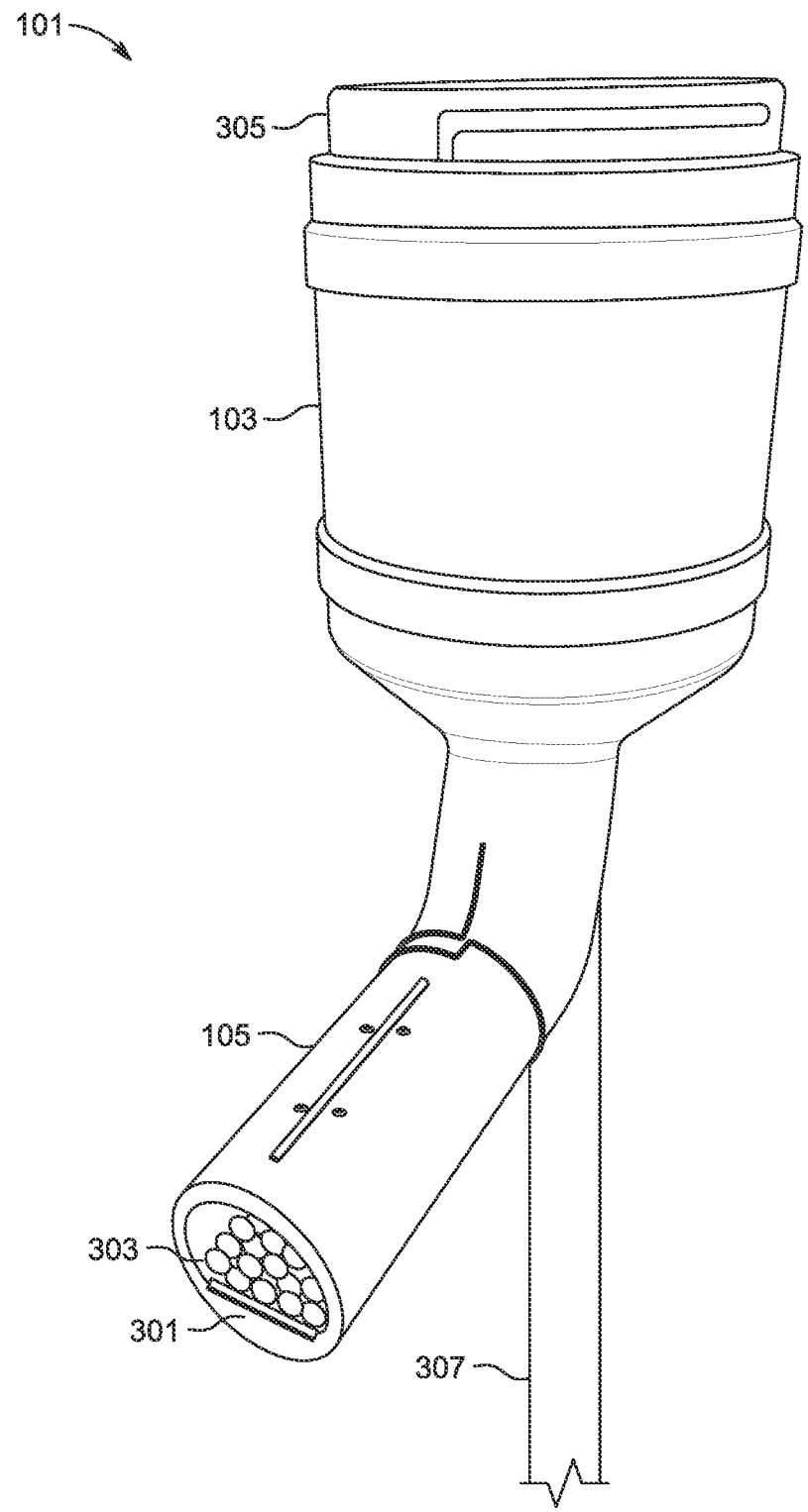
FIG. 3 is a perspective view of the animal feeder system of FIG. 1.

In FIG. 3, another side view further depicts the features of system 101. As shown, the system can include a dam 301 at the access device 111, which provides for holding feed 303 from pouring onto the ground. The lid 305 is removable in the preferred embodiment, which allows for adding feed. As shown, the system 101 can be secured to a post 307, tree, or other vertical apparatus.

Figure 4:
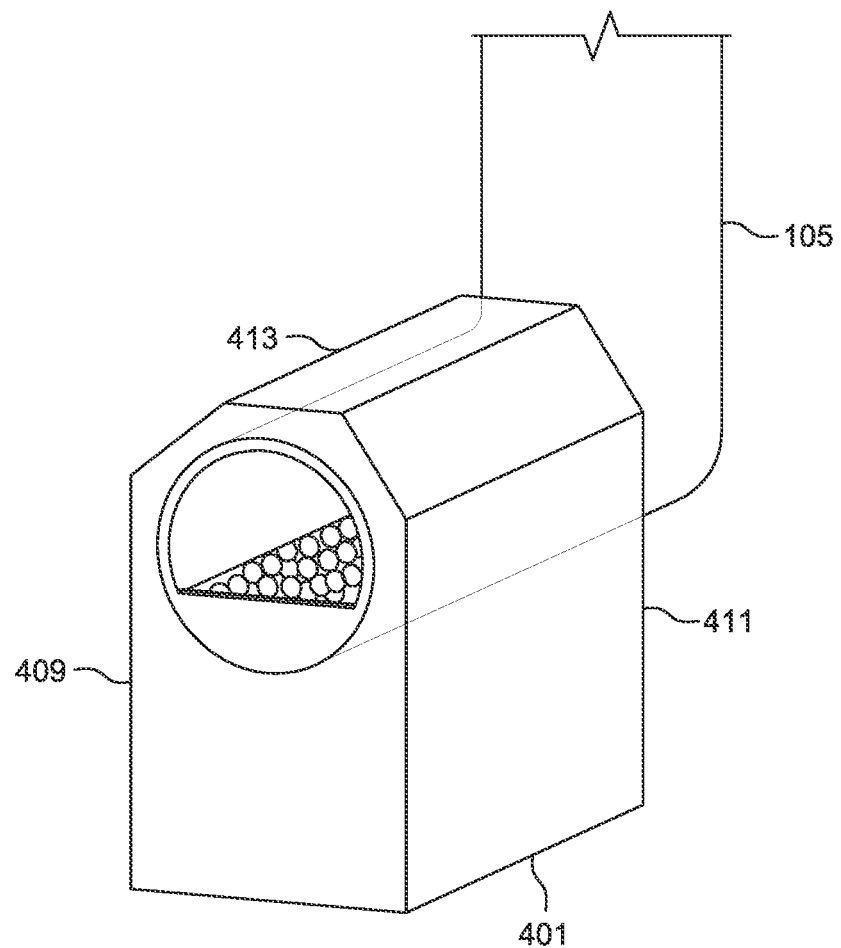
FIG. 4 is a perspective view of one embodiment of an animal feeder system with a housing attached to the outlet in accordance with the present invention.

In some embodiments, as shown in FIG. 4, the system can include a housing 401 attached to the outlet 105. The housing 401 can include various doors, such as a sliding door, actuator door, or rotating door. The housing 401 having a front 409, a lower section 411, and a top section 413, an enclosure 13 is created that can contain a battery, timer, controller, and electric motor.

Figure 5:
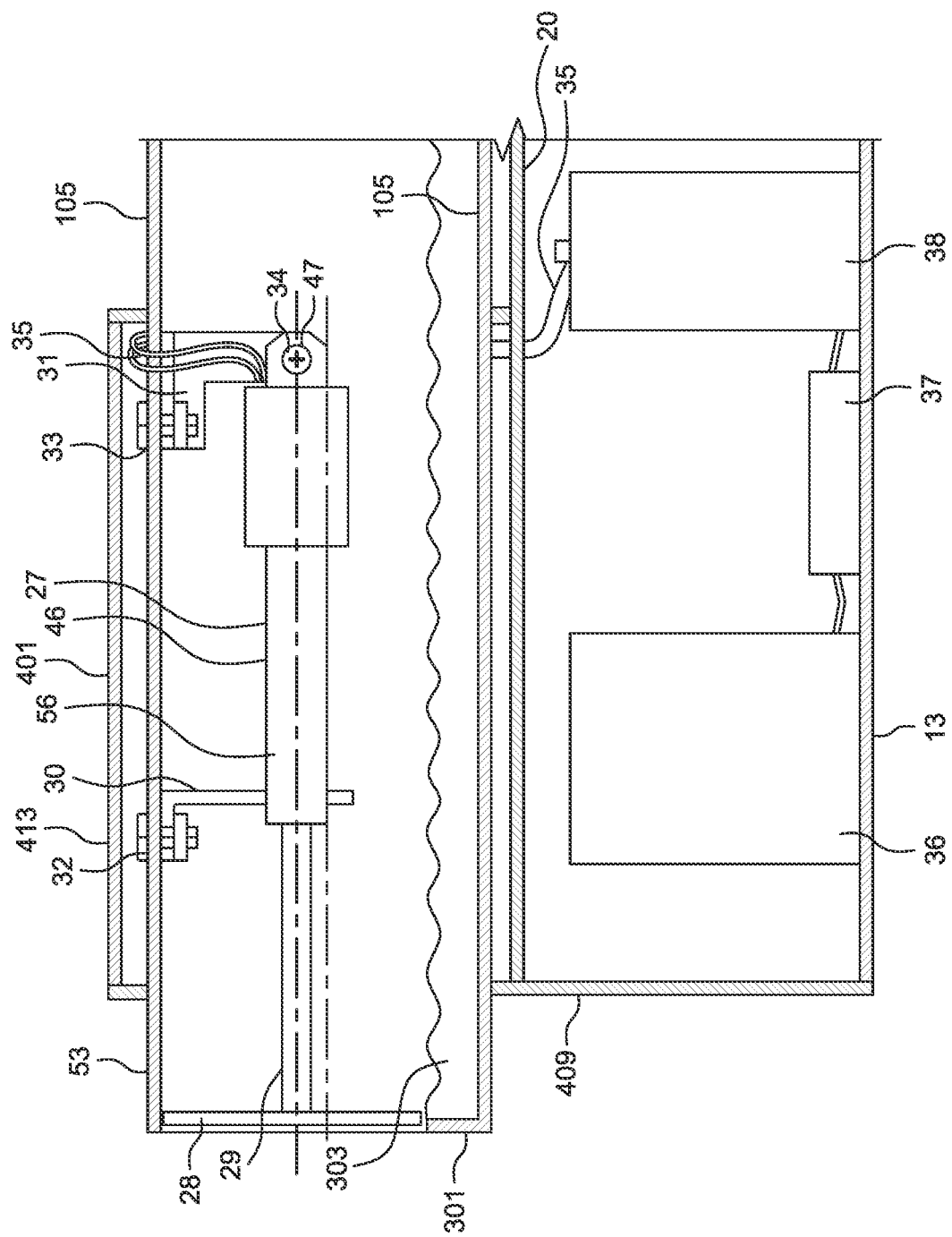
FIG. 5 is a detail view of one embodiment of a linear actuator from a side view of the present invention with a securely attached door in the closed position.

Referring to FIG. 5, one embodiment of an automatic feed access device 53 mechanism 56, in accordance with the present application, is shown. Device 53 including a door 28, a linear actuator 46 with its stationary body 27 and its extension rod 29 in the closed position. The door 28 securely attached to the end of the extension rod 29. The linear actuator 46 attached to the top of the outlet 105 by fixture 30 and by fixture 31. Fixture 30 is securely attached to the top of the outlet 105 by a nut and bolt assembly 32 at one end and slotted at its other end such that it tightly fits over the linear actuator 46 body 27 near the extension rod 29. Fixture 31 is securely attached to the top of the flow feed outlet 105 by nut and bolt assembly 33 at one end and securely fastened to the linear actuator 46 body 27 at eyelet 34 by a nut and bolt assembly 47. Electric motor wires 35 from the linear actuator 46 are shown running from the linear actuator 46 to outside the flow feed outlet 105 and down into the enclosure 13 within the housing 401, to attach to battery 38, timer 36 and controller 37 through the lower ceiling 20.

Figure 6:
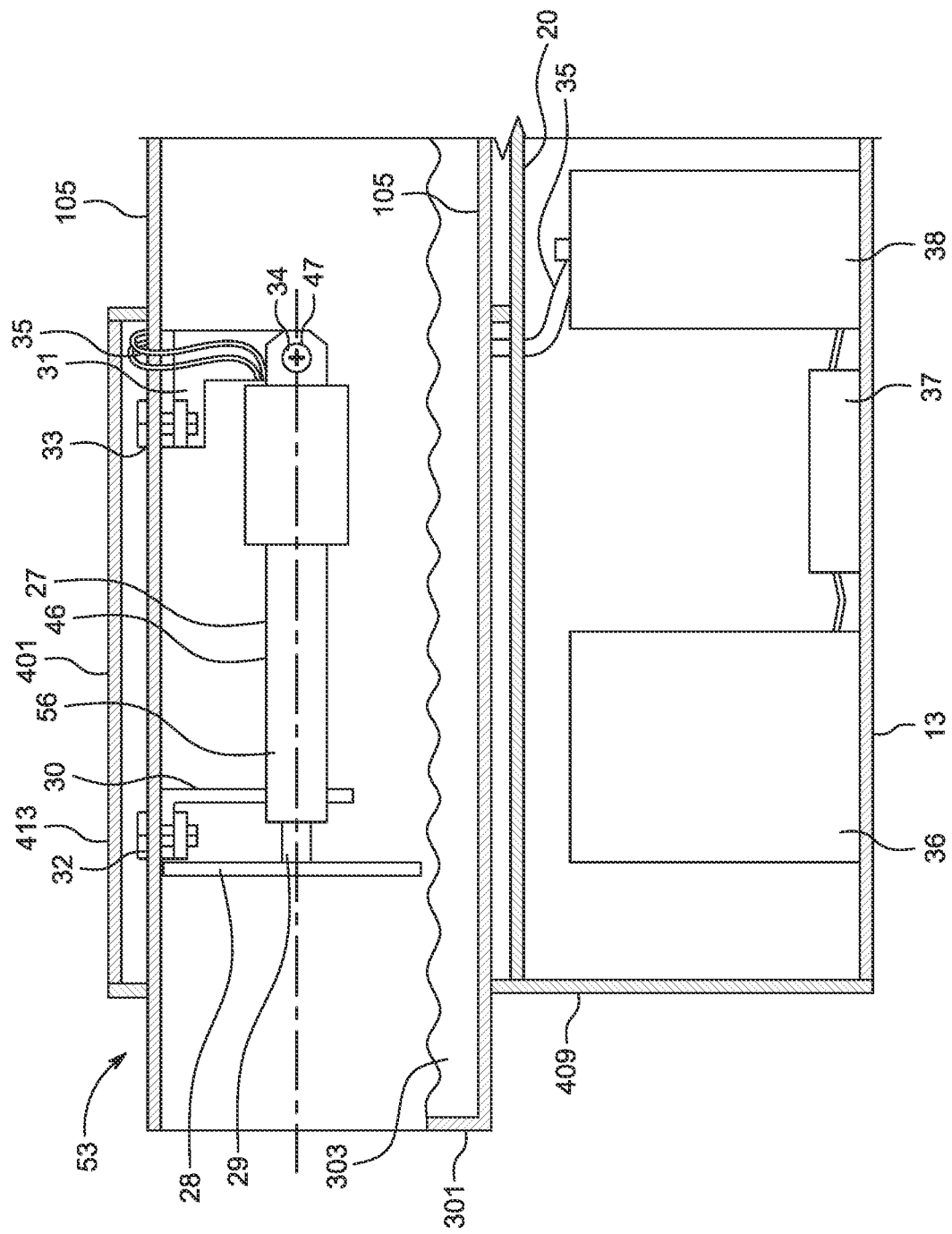
FIG. 6 is a detail view of one embodiment of a linear actuator from a side view of the present invention with a securely attached door in the open position.

Referring to FIG. 6, there is illustrated an embodiment of a feed access device 53 mechanism 56 comprising a door 28, a linear actuator 46 with its stationary body 27 and its extension rod 29 in the open position. The door 28 securely attached to the end of the extension rod 29. The linear actuator 46 attached to the top of the flow feed outlet 105 by fixture 30 and by fixture 31. Fixture 30 is securely attached to the top of the flow feed outlet 105 by nut and bolt assembly 32 at one end and slotted at its other end such that it tightly fits over the linear actuator 46 body 27 near the extension rod 29. Fixture 31 is securely attached to the top of the flow feed outlet 105 by nut and bolt assembly 33 at one end and securely fastened to the linear actuator 46 body 27 at eyelet 34 by a nut and bolt assembly 47. Electric motor wires 35 from the linear actuator 46 are shown running from the linear actuator 46 to outside the flow feed outlet and down into the sealed enclosure 13, to attach to battery 38, timer 36 and controller 37 through the lower ceiling 20.

Figure 7:
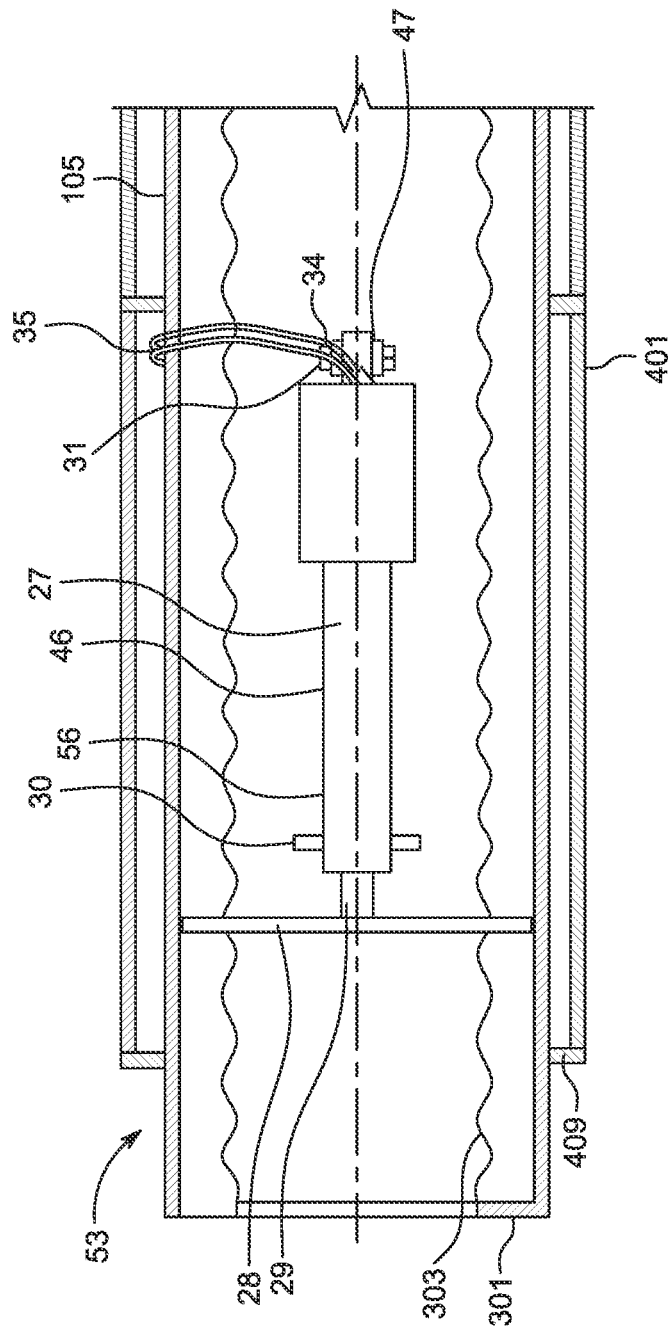
FIG. 7 is a detail view of one embodiment of a linear actuator from a side view of the present invention with a securely attached door in the open position.

Referring to FIG. 7, there is illustrated a preferred embodiment of an automatic feed access device 53 mechanism 56 comprising a door 28, a linear actuator 46 with its stationary body 27 and its extension rod 29 in the open position. The door 28 securely attached to the end of the extension rod 29. The linear actuator 46 attached to the top of the flow feed outlet 105 by fixture 30 and by fixture 31. Fixture 30 is securely attached to the top of the flow feed outlet 105 near the extension rod 29 and slotted at its other end such that it tightly fits over the linear actuator 46 body 27 near the extension rod 29. Fixture 31 is securely attached to the top of the flow feed outlet 105 securely fastened to the linear actuator 46 body 27 at eyelet 34 by a nut and bolt assembly 47. Electric motor wires 35 from the linear actuator 46 are shown running from the linear actuator 46 to outside the flow feed outlet.

Figure 8:
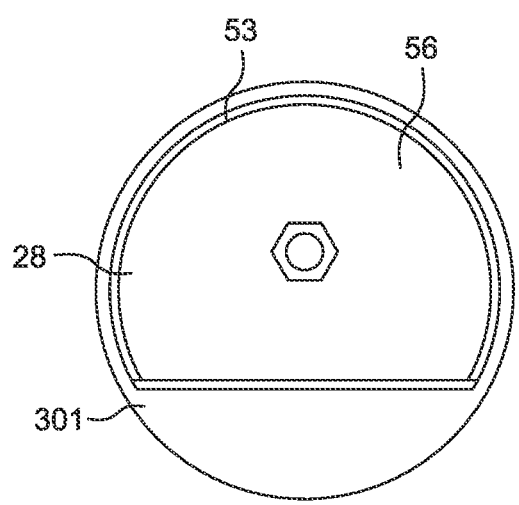
FIG. 8 is a front view of one embodiment of a linear actuator in accordance with the present invention.

Referring to FIG. 8, there is illustrated an end view of one embodiment of an automatic feed access device 53 mechanism 56 front end comprising the flow feed outlet 105 dam 301 and door 28.

Figure 9:
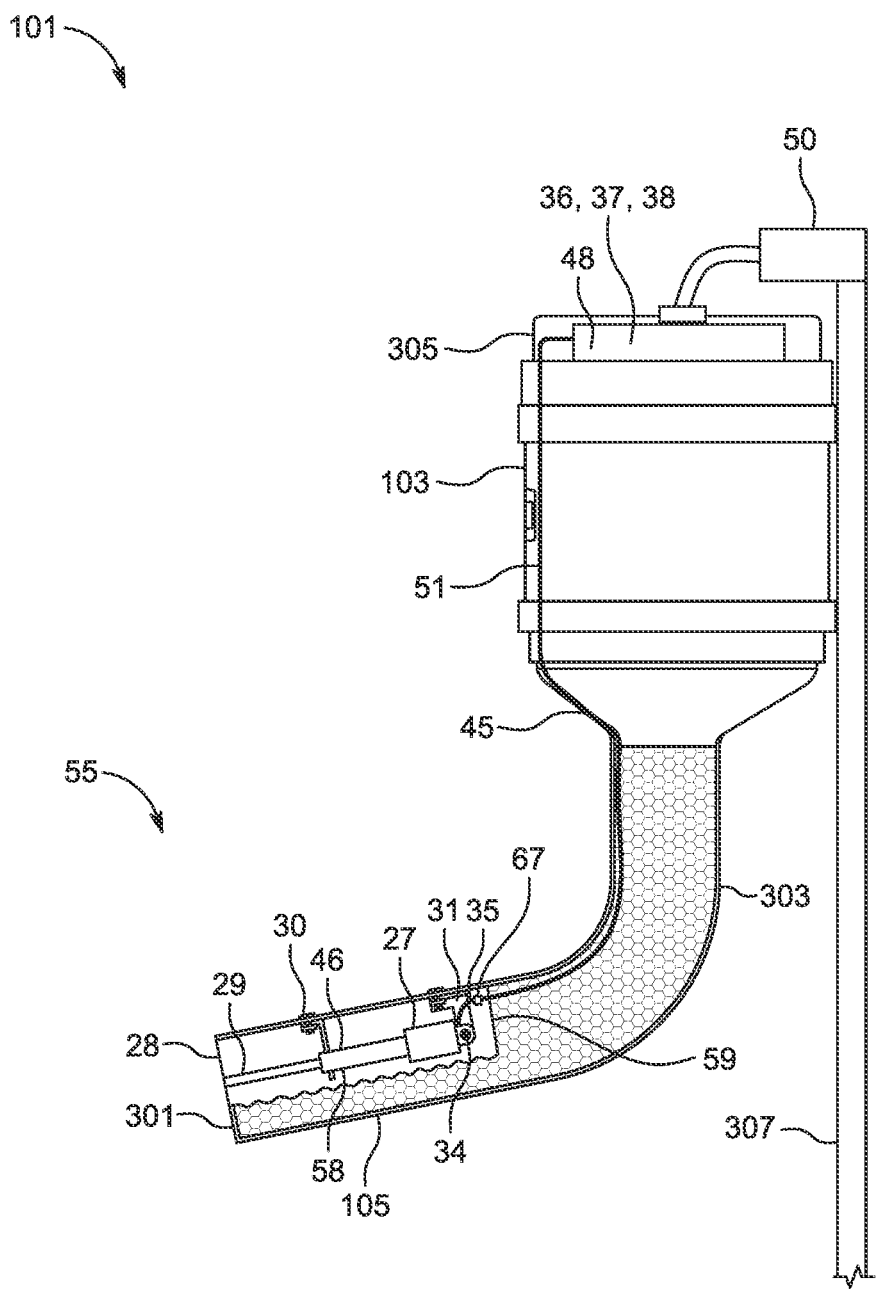
FIG. 9 is a side detailed view of one embodiment of an animal feeder system with a linear actuator type automatic feed access device and an enclosure for electrical components with the door in the closed position.

Referring to FIG. 9, there is illustrated another embodiment of an automatic feed access device 55 mechanism 58 in its closed position comprising a door 28, a linear actuator 46 with its stationary body 27 and its extension rod 29 in the extended position. The door 28 securely attached to the end of the extension rod 29. The linear actuator 46 attached to the top of the flow feed outlet 105 by fixture 30 and by fixture 31. Fixture 30 is securely attached to the top of the flow feed outlet 105 near the extension rod 29 and slotted at its other end such that it tightly fits over the linear actuator 46 body 27 near the extension rod 29. Fixture 31 is securely attached to the top of the flow feed outlet 105 securely fastened to the linear actuator 46 body 27 at eyelet 34. Electric motor wires 35 from the linear actuator 46 are shown being attached to wires 51 by electrical disconnects 67 and running through gravity flow feeder internal dam 59 up the side and being attached to outlet 105, a funnel 45, and feed storage container 103. Wires 51 attached battery 38, timer 36, and controller 37 in a sealed enclosure 48 attached to the underside of the feeder lid 305. The automatic feed access device 55 all being inside of the feeder 101. A solar panel 50 can be attached to the support pole 307 at the top with wires being attached to battery 38 through the top of the lid 305. An internal dam 59 may be provided which restricts feed 303 so that the automatic feed access device apparatus 55 is above and out of flow of feed 303, as shown.

Figure 10:
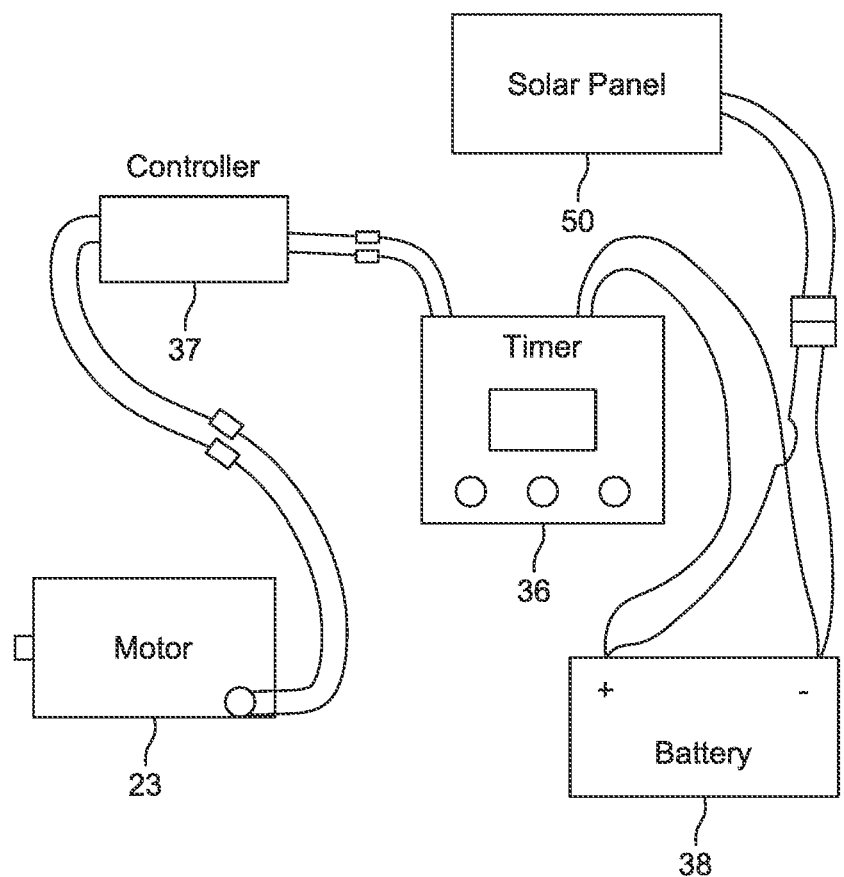
FIG. 10 is a schematic of electrical components in accordance with one embodiment of the present invention.

Referring now to FIG. 10, a schematic of some contemplated electrical components is shown. As shown, the system can include a battery 38, timer 36, controller 37 and solar panel 50, and electric motor 23 that can be used for automatic feed access device 53, 55, 60, 70, 76, 77. The electric motor 23 of automatic feed access device 55 being contained within the linear actuator 46. Timer 36 being used to set times desired for door to be activated for feed to be accessible and inaccessible. Controller 37 being programmed to change polarity of current to the motor 23 every time needed to run motor 23 in forward or reverse direction to either open or close the door 28, 66 for feed accessibility or inaccessibility. Solar panel 50 being used to keep the battery 38 the power source charged.

Referring now to FIG. 11, another contemplated embodiment of an automatic feed access device 60 mechanism 61 is shown in its closed position. The mechanism comprises a door 66, a linear actuator 46 with its stationary body 27 and its extension rod 29 in the extended position. The door 66 pivotally attached to the end of the extension rod 29 at pivot axis 63 and pivotally attached at the top of and near the opening of the flow feed outlet 105 at pivot axis 64. The linear actuator 46 attached to the top of the flow feed outlet 105 by fixture 31. Fixture 31 is securely attached to the top of the flow feed outlet 105 and pivotally attached to the linear actuator 46 body 27 at eyelet 34 and rotates through axis 62. Electric motor wires 35 from the linear actuator 46 are shown. Fixture 65 is securely attached to the top of the flow feed outlet 105 and pivotally attached to the door 66 at the pivot point 64.

Referring now to FIG. 12, there is illustrated the mechanism 61 of FIG. 11, wherein the door 66 is in an open position by pivoting about axis 63 and axis 64 and the linear actuator 46 extension rod 29 in its retracted position and the linear actuator 46 rotated about axis 62.

Figure 13:
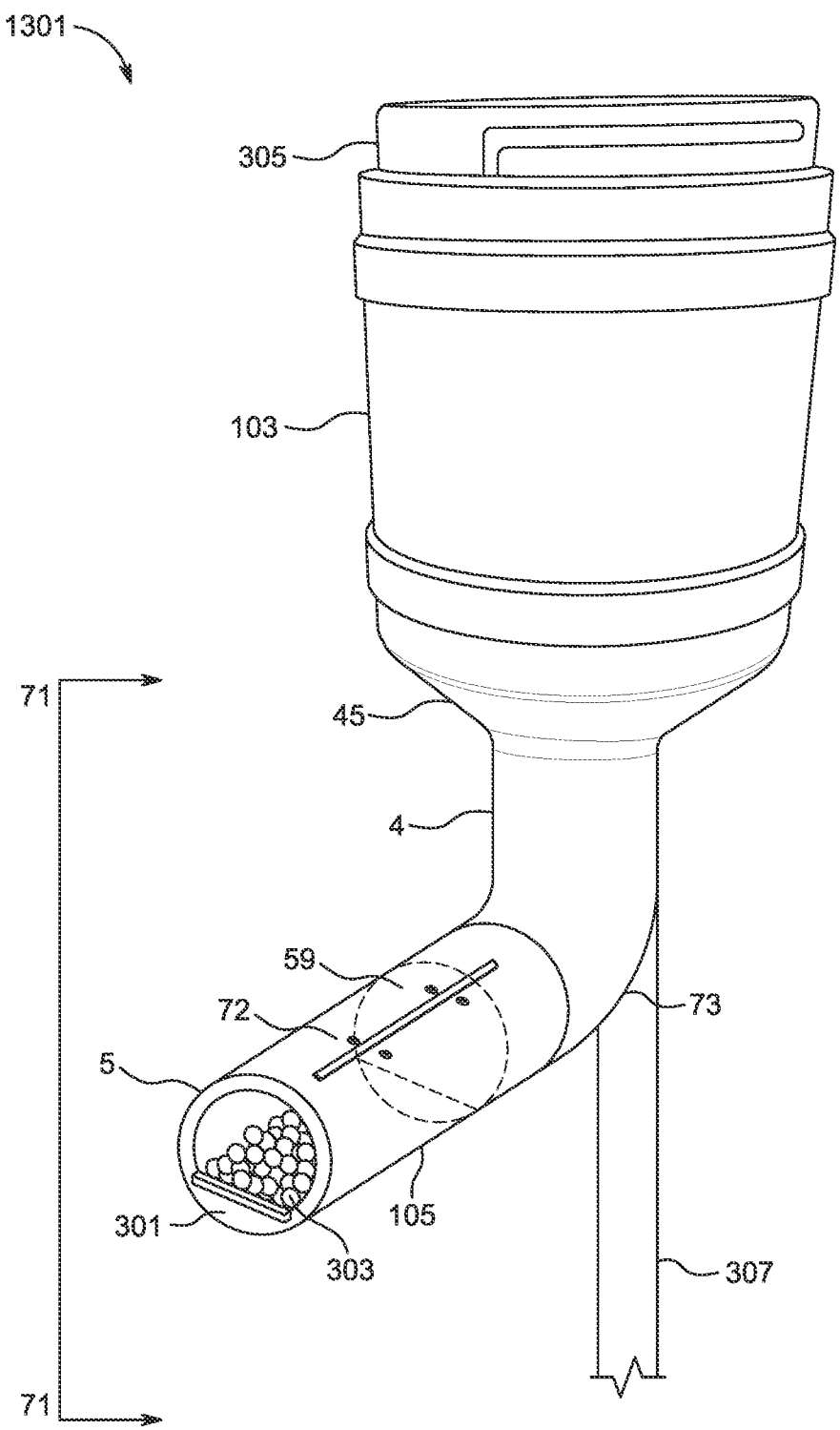
FIG. 13 is a perspective view of one embodiment of a gravity flow animal feeding apparatus with a removable outlet in accordance with the present invention.

In FIG. 13, another embodiment of an animal feeder system 1301 is shown. This feeder can contain some or all of the features discussed above. The system 1301 is adapted for substantially unattended feeding of hoofed animals including deer and various exotic animals. In particular, this apparatus is useful as a deer feeder. Generally, the gravity flow feeder 1301 includes the container 103 attached to the outlet 105 via a funnel 45. A vertical chamber 4 can be affixed to an inclined chamber 73, attached to removable angled chamber 72 as part of the outlet 105. The outlet 72 inside diameter covers the outside diameter of the inclined chamber 73 for the distance of about the outlet 72 diameter. The lower end of the inclined chamber 73 has a dam 59. The lower end 5 of the removable flow feed outlet 105 having a dam 301 at a lower portion for holding feed 303 from pouring out onto the ground. A removable lid 305 allows for adding feed to the feed storage container 103. The system can be elevated via a tree, a post 307, legs or other structures.

Figure 14:
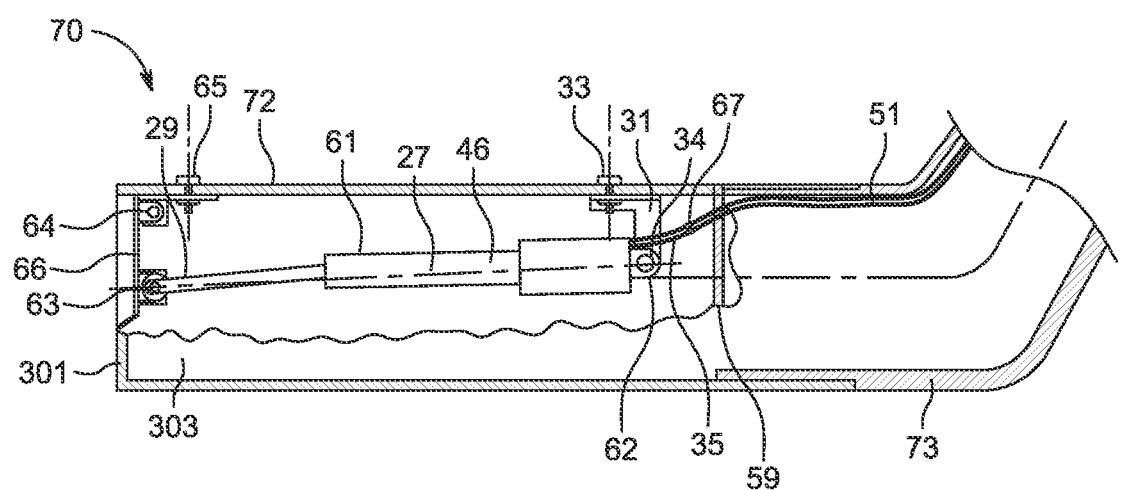
FIG. 14 is a detail side view of one embodiment of a removable outlet with a linear actuator with a pivotally attached door hinged to the top of the outlet in the closed position in accordance with the present invention.

In FIG. 14, another embodiment of an automatic feed access device 70 mechanism 61 in its closed position is shown. Device 70 and mechanism 61 comprising a door 66, a linear actuator 46 with its stationary body 27 and its extension rod 29 in the extended position. The door 66 pivotally attached to the end of the extension rod 29 at pivot axis 63 and pivotally attached at the top of and near the opening of the removable flow feed outlet 72 at pivot axis 64. Fixture 65 is securely attached to the top of the removable flow feed outlet 72 and pivotally attached to the door 66 at the pivot point axis 64. The linear actuator 46 attached to the top of the flow feed outlet 72 by fixture 31. Fixture 31 is securely attached to the top of the flow feed outlet 72 and pivotally attached to the linear actuator 46 body 27 at eyelet 34 and rotates through axis 62. Electric motor wires 35 from the linear actuator 46 ends are attached to electrical disconnects 67. The automatic feed access device 70 is attached to the flow feed outlet 72 prior to assembly with the inclined chamber 73. At assembly of the flow feed outlet 72 to the inclined chamber 73, the electrical disconnects 67 at the end of the motor wires 35 are attached to the electrical disconnects 67 at the end of the wires 51. Wires 51 pass through hole and sealing grommet in dam 59. Gravity flow feeder 1301 dam 59 is shown where it restricts feed 303 below small vertical cylinder 4 on the lower side of the flow feed outlet 72 so that the automatic feed access device apparatus 70 is above and out of flow of feed 303.

Figure 15:
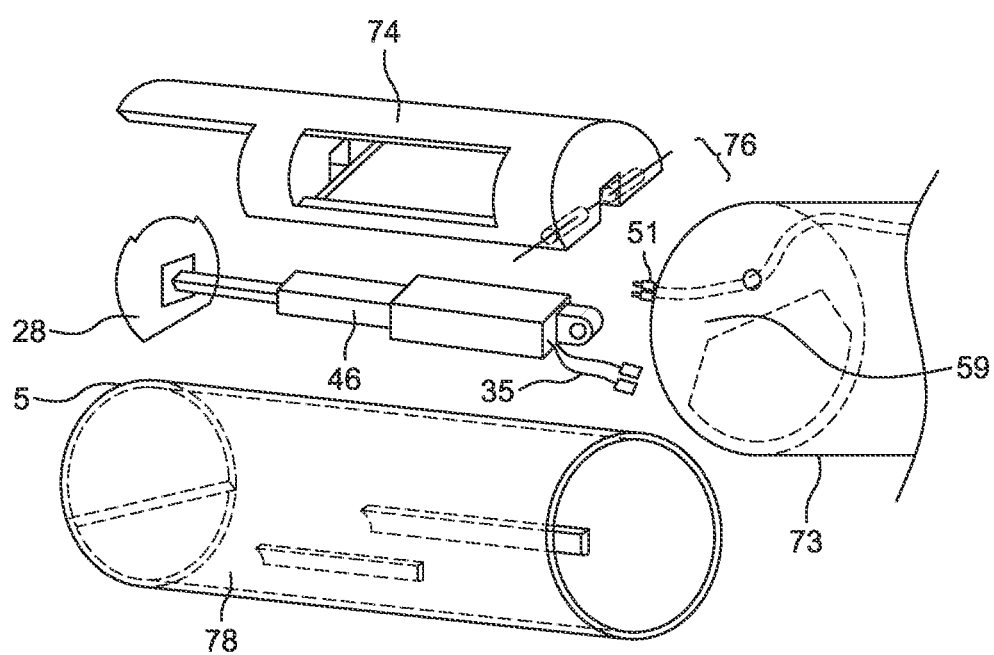
FIG. 15 is a detailed view of a blown-up assembly of an automatic feed access device cartridge with the door rigidly attached to the end of the linear actuator extension rod.

In FIG. 15, a blown up deconstructed view of an automatic feed access device 76 is shown with its major parts, including a cartridge fixture 74, rigidly attached door 28, linear actuator 46, and removable flow feed outlet 78 with ridges to secure cartridge fixture 74 in place radially and circumferentially. The cartridge fixture 74 being secured axially upon assembly of the automatic feed access device 76 to the inclined chamber 73 being captured between the flow feed outlet opening lip 5 and the inclined chamber 73 dam 59. Also, upon assembly the wires 35 being attached to the wires 51.

Figure 16:
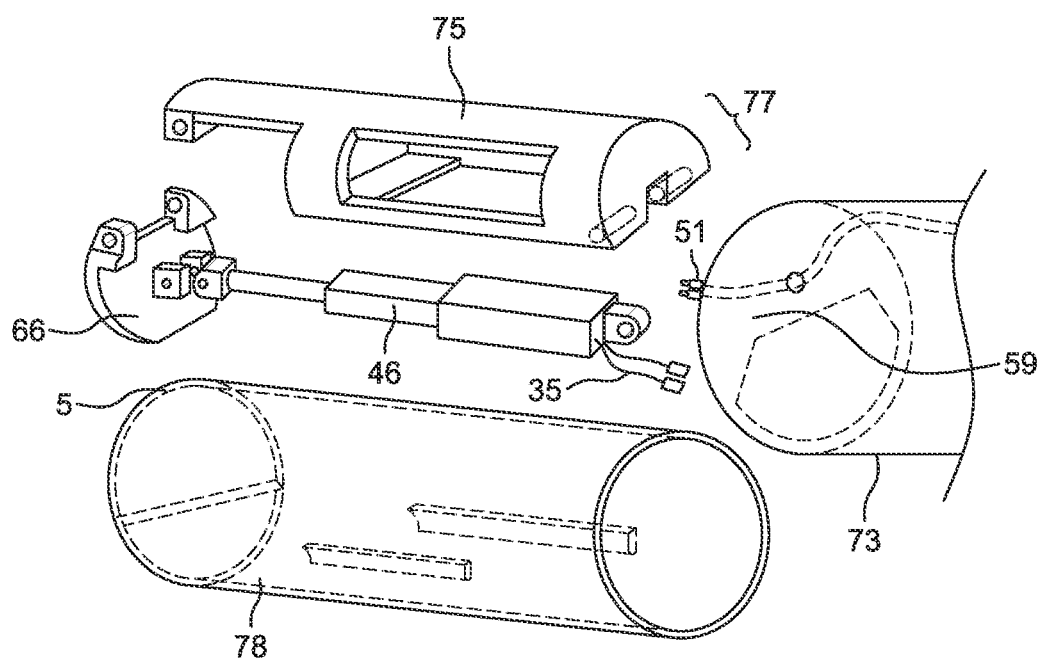
FIG. 16 is detailed view of a blown-up assembly of an automatic feed access device cartridge with the door pivotally attached to the end of the linear actuator extension rod and pivotally attached to the top of the cartridge.

In FIG. 16, a blown up deconstructed view of another embodiment of an automatic feed access device 77 with its major parts, cartridge fixture 75, pivotally attached door 66, linear actuator 46, and removable flow feed outlet 78 with ridges to secure cartridge fixture 75 in place radially and circumferentially. The cartridge fixture 75 being secured axially upon assembly of the automatic feed access device 77 to the inclined chamber 73 being captured between the flow feed outlet opening lip 5 and the inclined chamber 73 dam 59. Also, upon assembly the wires 35 being attached to the wires 51.

Figure 17:
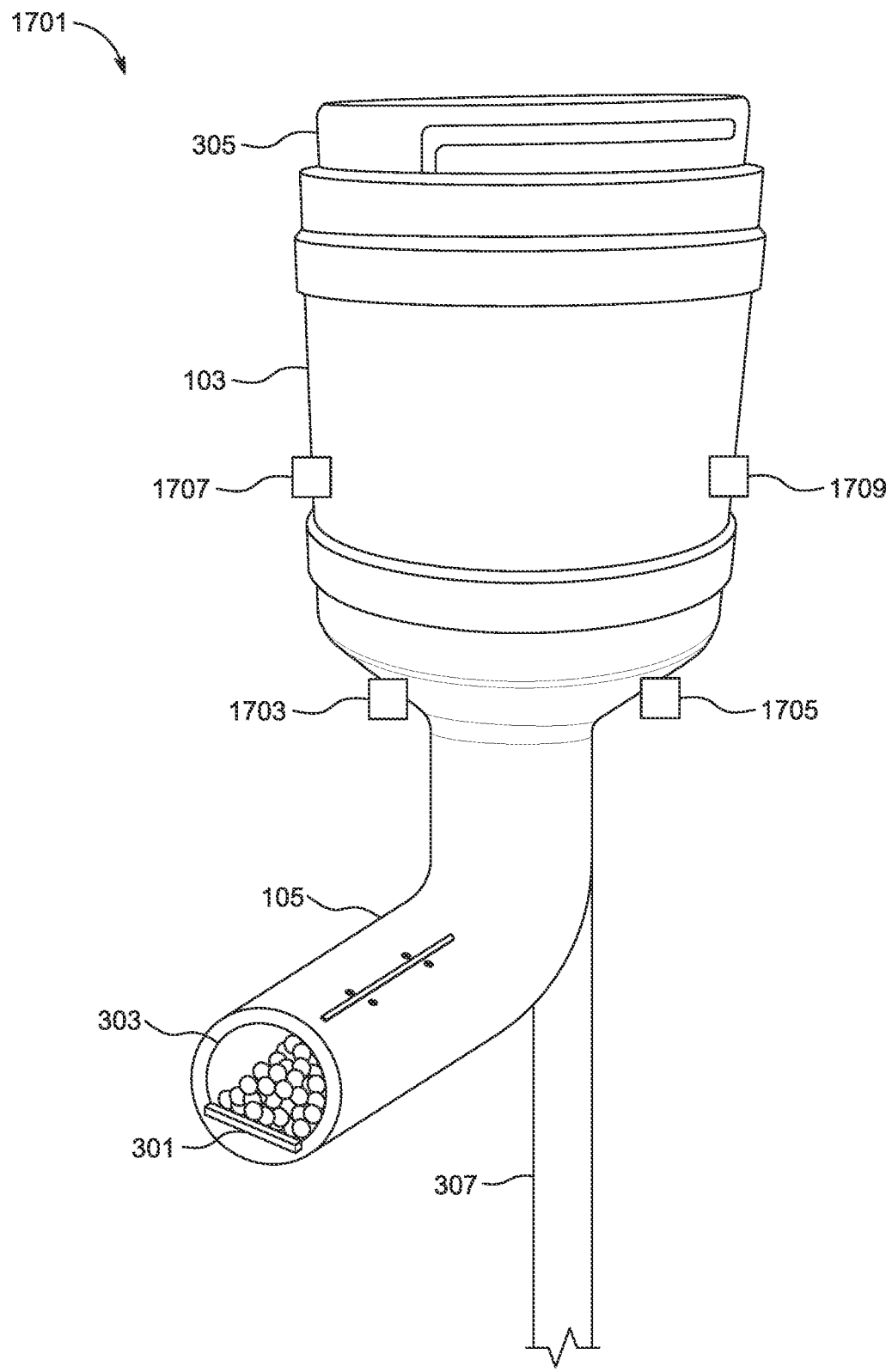
FIG. 17 is a side perspective view of an animal feed system with a sensor suit in accordance with an alternative embodiment of the present application.

In FIG. 17, another embodiment of an animal feeder system 1701 is shown. This system 1701 can include some or all of the features discussed above. In addition, system 1701 includes a sensor suite, which in the preferred embodiment includes a first sensor 1703, a second sensor 1705, a third sensor 1707, and a fourth sensor 1709. The first two sensors are at a first and a second position along the feeder system 1701. In some embodiments, the sensors are motion sensors and are secured to the container 103, however, it is contemplated that the sensors may vary in technological features and may be secured in various places along the entire system 1701 as necessary.

Figure 18:
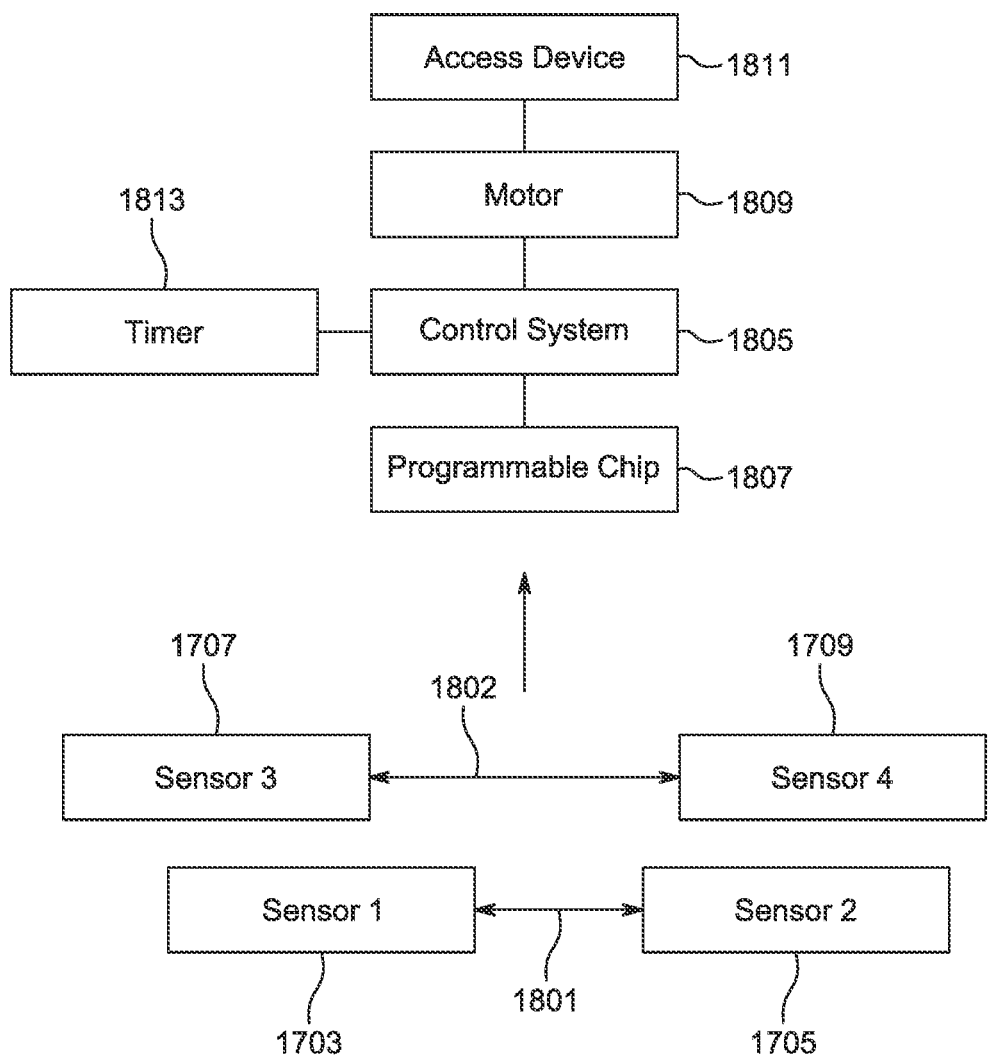
FIG. 18 is a schematic of the electrical components of the system of FIGS. 17A and 17B.

In FIG. 18, the sensor suite is further shown. As shown, the first sensor 1703 and the second sensor 1705 are positioned at a predetermined distance 1801 from one another in a horizontal configuration. The sensors are positioned such that they detect movement at a first location and a second location. This distance 1801 is to determine a minimal size of a buck antlers by sensing movement for each side. As an option the distance 1801 can be set at a shorter distance to sense the movement of doe's ears by sensing movement for each side. The third and fourth sensors are positioned at a second distance 1802, which can be optionally used to determine a maximum size or a second size of the antlers. The sensor suite will communicate with a control system 1805 via a programmable chip 1807 to operate a motor 1809 to open and close the access device 1811 based on a timer 1813.

Figure 17A:
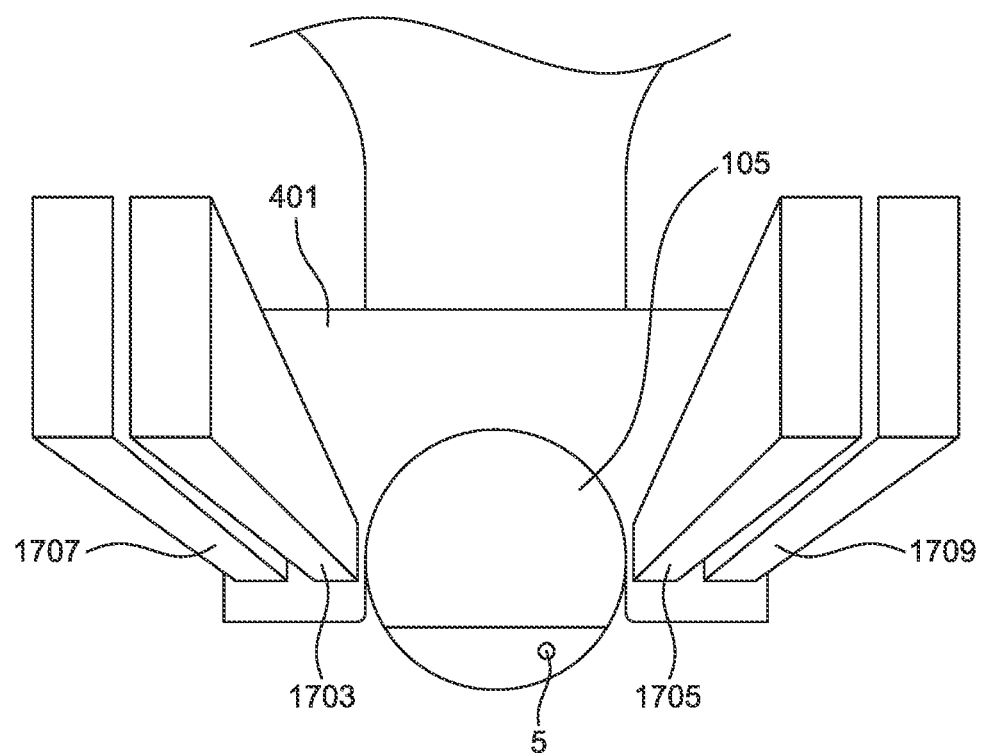
FIG. 17A is a front view of an animal feed system with a sensor suite in accordance with an alternative embodiment of the present application.
Figure 17B:
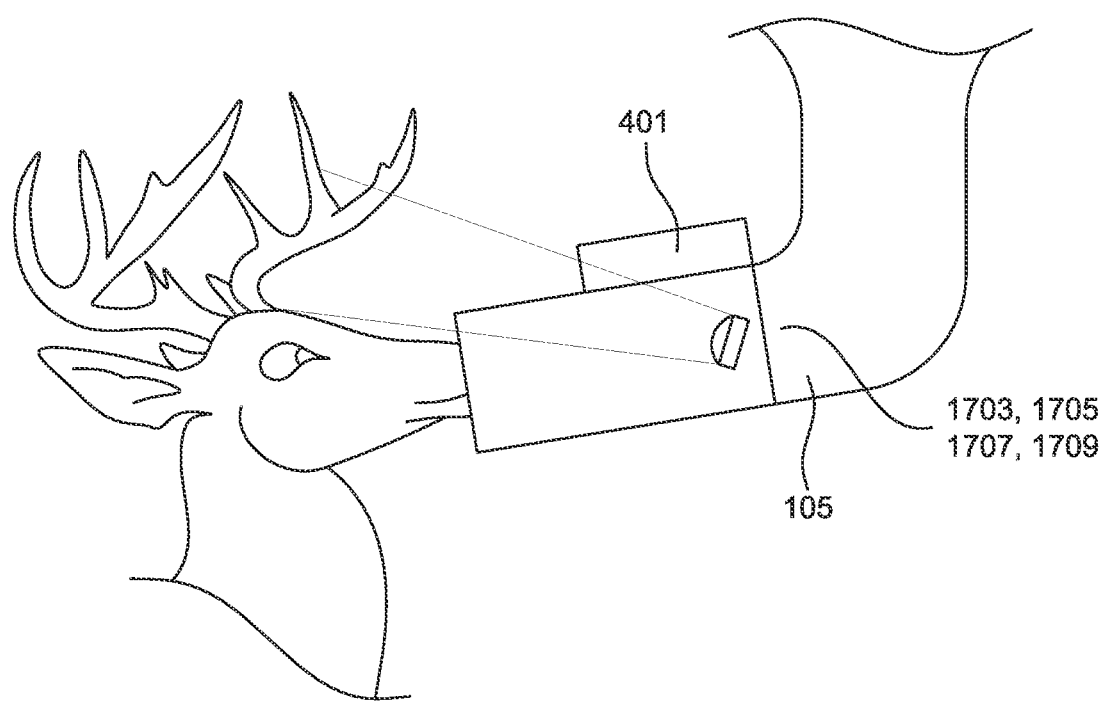
FIG. 17B is a side view of an animal feed system with a sensor suite in accordance with an alternative embodiment of the present application.

As shown in FIGS. 17A and 17B, it should be appreciated that the sensors are positioned to view buck antlers or doe ears above the feeder outlet as a buck or doe is feeding. The first two sensors, 1703, 1705 are adjustably positioned at the discretion of the user to sense motion of the antlers at least 13 inches apart or doe ears at a shorter separation distance a minimum of 9 inches apart. This is achieved by sensing movement by both sensors at the same time. The second two sensors 1707, 1709 are positioned further apart at the discretion of the user, such as 13-20 inches. These adjustments allow the user to choose to determine number of does and bucks of a minimum of 13 inches of spread or to choose to determine the size of a buck's antlers of 13 inches or more of spread. The exact positioning of the sensors can vary such as positioning the sensors to view approximately 3-12 inches above the top of the outlet opening at beyond the opening about 12 inches. Animals feeding with their month in the outlet end will have antlers and or ears about 12 inches from the outlet end. To minimize sensing unintended movement away from the distance of interest sensors are positioned along the sides of the outlet at an upward and outward angle from each other.

The information collected from the sensors is processed via a programmable chip 1807 to determine the optimal times to activate opening and closing of the access device 1811 via the motor 1809.

During use, the system will register when both of the first two sensors 1703, 1705 are active at the same time and/or when the two exterior sensors 1707, 1709 are active at the same time. The control system and programmable chip will collect data at every interval, such as every 30 seconds, to create a catalog of data.

In a preferred method of use, the system 1701 will be utilized three to four months before hunting season. The first three to four weeks, the feeder will be programmed to open for most of night through optimum hunting times.

Optimum hunting times for AM is at sunup to say 10 AM and for PM times is say 5 PM to sunset. From this input program sets a base line for volume (average time between days of activity) and length (average times of sequential activity). More than one time of activity and size of buck may be registered each day. The programmable chip can pick top two times of activity each in AM and PM to re-program the timer going forward. By default, the programmable chip with the control system can have options to automatically pick a time of largest deer activity.

In some embodiments, a user interface could be allowed to make picks for times of choice. The programmable chip and control system will utilize technology, such as machine learning, to start moving times of feed access in a necessary direction such that the deer are encouraged to eat at an optimal hunting time.

It should be appreciated that deer may not visit feeder in consecutive days. If so, may use lesser time change. Now, if volume and/or length of time of activity reduces by say 30% with results weighted toward volume over length of time, stop change of times. Restart time changes once activity resumes to say 90% of base line. Program changes times until set times of legal hunting hours is achieved. Also, doe activity and change could be part of program to determine time changes because their presence will attract bucks. The doe activity and activity change would be weighted compared to the buck activity.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An animal feeding system, comprising:
   a feed storage container having an interior area configured to receive and hold an animal feed;
   an outlet attached to the feed storage container at a first end and extending to a second end, the outlet configured to allow the animal feed to flow therethrough via gravity to the second end;
   an access device attached at the second end of the outlet;
   a motor in electrical communication with the access device and configured to open and close the access device to provide and remove access to the animal feed; and
   a control system in electrical communication with the motor, the control system sending one or more commands to the motor, the control system further having:
   a programmable chip;
   a sensor suite, the sensor suite collecting information to provide to the programmable chip, the sensor suite includes:
   a first motion sensor attached to the feed storage container at a first position; and
   a second motion sensor attached to the feed storage container at a second position;
   wherein the first motion sensor and the second motion sensor are directed toward the outlet second end such that the first motion sensor and the second motion sensor detect movement 10 to 15 inches beyond the outlet second end, being adjustable between 9 and 13 inches apart;
   wherein the first motion sensor and the second motion sensor are directed towards the outlet second end such that the first motion sensor and the second motion sensor detect movement between 3 and 12 inches above the outlet second end;

wherein the programmable chip operates a timer based on the information from the sensor suite to open and close the access device at one or more determined times;

wherein a data log is created based on the information from the sensor suite received by the programmable chip.

2. The system of claim 1, further comprising:

a third motion sensor attached to the feed storage container at a third position; and a fourth motion sensor attached to the feed storage container at a fourth position;

wherein the third motion sensor and fourth motion sensor are directed towards the outlet second end such that the third motion sensor and fourth motion sensor detect movement 10 to 15 inches beyond the outlet second end adjustable to minimum of 13 inches apart; and wherein the third and fourth sensor are directed towards the outlet second end such that detection of movement between 3 and 12 inches above the outlet second end at 10 to 15 inches beyond the outlet second end is achieved.

3. The system of claim 1, wherein the programmable chip receives motion data from the first motion sensor and the second motion sensor and determines when the first motion sensor and the second motion sensor are activated at the same time and catalogs data points therewith.

4. The system of claim 1, wherein the programmable chip is configured to utilize machine learning to determine one or more optimal times to input into the timer for the opening and closing of the access device, and further alters the timer over a length of time to alter opening and closing of the access device to correlate to hunting times.

5. A method of automatic animal feeding, comprising;

providing the animal feeding system of claim 1;

collecting data from the sensor suite to provide the information to the programmable chip;

determining, via the programmable chip and a computing system, one or more optimal times to operate the motor to open or close the access device, the one or more optimal times being based on information received from the sensor suite relating to activity determined to be a buck or doe of a predetermined size within a presence of the feeder; and altering, via the programmable chip, the one or more optimal times to match predetermined hunting times.

\* \* \* \* \*